United States Patent [19]

Bobilin

[11] 3,909,541

[45] Sept. 30, 1975

[54] LOW-SPEED FRAMING ARRANGEMENT FOR A HIGH-SPEED DIGITAL BITSTREAM

[75] Inventor: Richard Thomas Bobilin, Fair Haven, N.J.

[73] Assignee: Bell Telephone Laboratories, Incorporated, Murray Hill, N.J.

[22] Filed: Mar. 11, 1974

[21] Appl. No.: 450,202

[52] U.S. Cl. .......... 179/15 BS; 179/15 BF

[51] Int. Cl.[2] .......... H04J 3/06

[58] Field of Search .......... 179/15 A, 15 BS, 15 BF

[56] References Cited

UNITED STATES PATENTS

| | | | |
|---|---|---|---|
| 3,571,516 | 3/1971 | Ohyama | 179/15 BS |
| 3,602,647 | 8/1971 | Kawashima | 179/15 BS |
| 3,639,693 | 2/1972 | Bartlett | 179/15 A |
| 3,696,210 | 10/1972 | Peterson | 179/15 BF |

*Primary Examiner*—Ralph D. Blakeslee
*Attorney, Agent, or Firm*—John Francis Moran

[57] ABSTRACT

A high-speed digital bitstream comprising information, from a plurality of multiplexed channels, and framing bits is unconditionally divided into a number of lower speed bitstreams. The lower speed bitstreams are then conditionally divided to form a new group of bitstreams, and the new bitstreams are examined by a framing detector. The framing detector shifts the timing of the conditional division in relation to the lower speed bitstreams until a predetermined framing pattern appears among the new bitstreams. The nature of the occurrence of the framing pattern identifies the operating mode of the unconditional division. The new bitstreams are switched, in accordance with the operating mode, to provide a plurality of outputs wherein each output corresponds to a particular multiplexed channel regardless of the operating mode of the unconditional division.

9 Claims, 3 Drawing Figures

LOW-SPEED FRAMING ARRANGEMENT FOR A HIGH-SPEED DIGITAL BITSTREAM

BACKGROUND OF THE INVENTION

This invention relates to data transmission systems and, more particularly, to framing synchronization techniques for high-speed bitstreams.

A common method of providing transmitter and receiver synchronization is to transmit information in predetermined groups or frames separated by interleaving framing bits which form a predetermined framing pattern. The receiver utilizes the fixed spacing between the framing bits for detecting and maintaining framing synchronization. Heretofore, this process has been performed directly on the transmitted bitstream without any undue difficulty.

For ultra-high-speed transmission, such as that used in certain time-division multiplex communication systems, high-speed logic circuits are required to operate at their upper speed limits to maintain framing for demultiplexing purposes. These high-speed logic circuits are not only expensive, but require that substantial constraints be observed in the physical layout of the circuitry. These constraints are necessary to keep parasitic effects to a minimum and to dissipate the heat produced by high-speed switching. Such constraints reduce design flexibility and further increase costs. Another approach for the framing of a high-speed bitstream has been to conditionally divide the high-speed bitstream into a plurality of low-speed bitstreams. The low-speed bitstreams are then examined to find the framing bits, while feedback to the divider enables the slipping of bits in the high-speed bitstream to obtain the desired framing pattern among the low-speed bitstreams. The disadvantage of this approach is that the circuitry used to slip bits must still operate on the high-speed bitstream.

SUMMARY OF THE INVENTION

It is, accordingly, a primary object of the present invention to provide demultiplexing apparatus for use in high-speed time-division multiplex communication systems wherein the demultiplexing apparatus is capable of operating upon information transmitted at high-speed bit rates without imposing substantial hardware speed limitations on the overall time-division multiplex system associated therewith.

It is a related object of the invention to provide a flexible demultiplexing arrangement which does not impose any substantial constraints upon the selection of the format for the high-speed bitstream.

A further object of the invention is to perform the entire demultiplexing operation by operating exclusively on low-speed bitstreams, thereby increasing the timing margins associated with the handling of a high-speed bitstream.

In accordance with the invention, a high-speed digital bitstream comprising a group of M time-division multiplexed low-speed channels plus framing bits is unconditionally divided into N low-speed digital bitstreams. A clock derives an output signal of frequency R/N from the high-speed digital bitstream, which has a bit rate of R bits per second. The output signal of this clock is used to divide the high-speed bitstream, and it is also used by a second divider. The second divider supplies P phased output signals. The divided N digital bitstreams and the multiphase signals (P) are supplied to switching circuitry. To acquire framing synchronization, the multiphased outputs of the second divider are shifted until the occurrence of one of N possible framing patterns is observed by a framing detector. The switching circuitry then proceeds to establish the appropriate interconnections between the N digital bitstream and M output lines such that each output line only provides the digital information contained in one of the multiplexed low-speed channels of the high-speed bitstream.

In a specific illustrative embodiment of the invention, a high-speed digital bitstream comprising a plurality of time-division multiplexed channels and framing bits is unconditionally divided into a first and a second bitstream. The two bitstreams are applied to a separator which then conditionally divides each of the applied bitstreams into four lower speed bitstreams. Of the eight bitstreams produced by the separator, six are fed into a switch which has six outputs, each of which corresponds to one of the time-division multiplexed channels. The other two bitstreams are fed into a framing detector which shifts the division process of the separator until a given framing pattern is detected by the framing detector. The nature of the occurrence of the framing pattern serves to indicate the operating mode of the first division of the high-speed bitstream, i.e., in one mode odd-numbered bits appear in the first bitstream, while in the other mode these same bits appear in the second bitstream. The framing detector indicates the mode to control the switch which responds by establishing the appropriate interconnections between its inputs and outputs, such that each output only provides the information bits corresponding to one of the multiplexed channels.

A particularly advantageous feature of the apparatus of the specific illustrative embodiment of the invention is its use in providing framing synchronization in high-speed digital data systems, such as the Bell System's T4 Carrier System.

BRIEF DESCRIPTION OF THE DRAWINGS

These and other objects and features of the invention will be more readily appreciated and better understood by reference to the following detailed description which should be considered in conjunction with the accompanying drawings in which.

DETAILED DESCRIPTION

Figure 1:
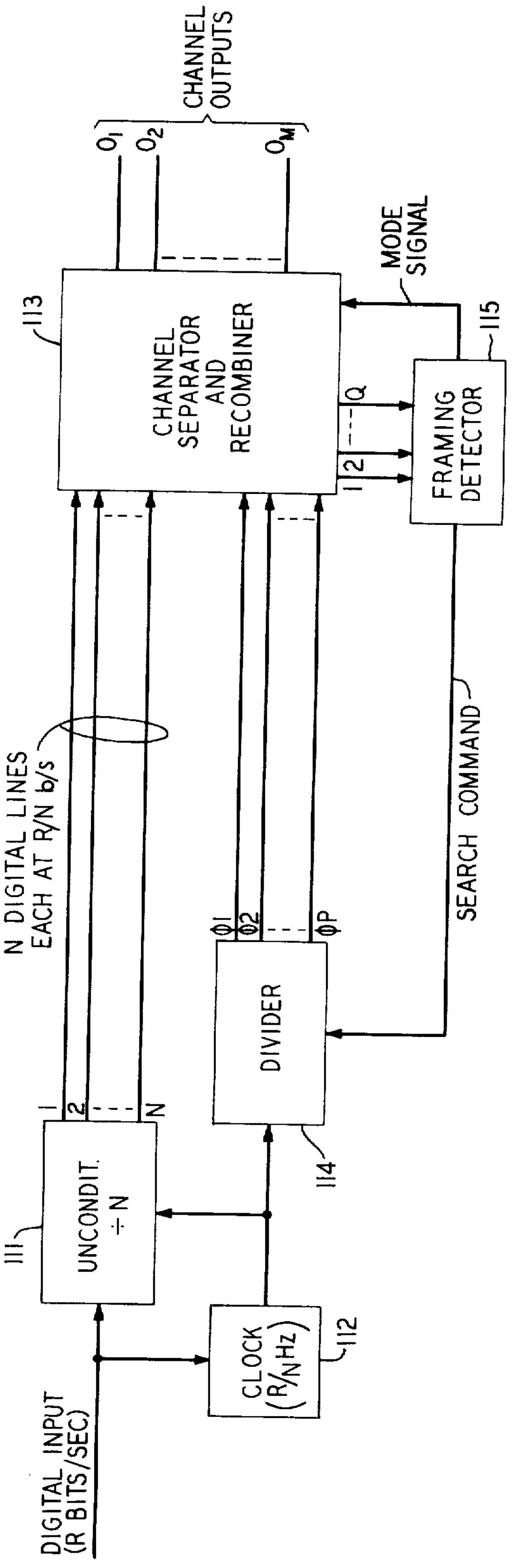
FIG. 1 is a generalized block diagram of a demultiplexer constructed in accordance with the invention.

FIG. 1 is a generalized block diagram of demultiplexing apparatus in accordance with the invention. A high-speed digital bitstream in a framed format wherein each frame comprises a predetermined number of information bits from each of M low-speed multiplexed channels is applied to divider 111. Divider 111 unconditionally divides the digital input bitstream into N parallel bitstreams. The duration of the time slot common to all N bitstreams is N times the duration of the time slot in the incoming high-speed bitstream. The high-speed digital input is also applied to clock 112 which produces pulses at a frequency of R/N Hz, where R is the bit rate of the digital input. The output of clock 112 supplies a second input to divider 111 to gate the divider which successively distributes the digital bits among N digital lines. Each of the N digital lines has a bit rate of R/N.

These N digital lines are applied to a channel separator and recombiner 113. An accompanying input to the separator and recombiner 113 is supplied by the P phased signals from divider 114. Divider 114 derives these phased signals from the output of clock 112. Channel separator and recombiner 113 proceeds, in accordance with the multiphased signals from divider 114, to separate the N digital lines and then recombine them so as to provide digital information at outputs $O_1$ through $O_M$ which corresponds to the 1 through M channels originally included in the digital input to FIG. 1. Since divider 111 divides the digital input, as received, in a nonsynchronous fashion, each of the N digital lines will probably contain some combination of the bits from M channels. Therefore, the Q initial outputs applied to framing detector 115 from the separator and recombiner 113 will not likely contain a recognizable framing pattern. Framing detector 115 therefore issues a search command signal which is fed back to divider 114. In response, divider 114 shifts its multiphase output in unison. For each shift, the time reference of the multiphase outputs slips a digital bit in relation to the N digital lines. This shifting process continues until framing detector 115 recognizes a framing pattern among the Q input lines applied thereto. Since the division of divider 111 is nonsynchronous or unconditional, the nature of the occurrence of the framing pattern can take on any one of N possibilities. Framing detector 115 recognizes the particular framing pattern that does occur, which is dependent upon the operating mode of divider 111. In accordance with the recognized operating mode, framing detector 115 issues a mode signal to the channel separator and recombiner 113. The mode signal is a digital word which identifies the operating mode of divider 111. With this latter input, the channel separator and recombiner 113 now has sufficient information to determine the proper routing of the digital information contained in the N digital lines to produce M digital outputs wherein each output only provides the information corresponding to one of the M channels contained in the digital input. Since the ordering of the M channels is predetermined by the framing format, output $O_1$ will produce the information contained in channel 1 and this will carry through for each output up to output $O_M$ which produces the information contained in channel M.

As previously stated, M in FIG. 1 represents the number of low-speed digital channels included in the input digital bitstream. The value of N which is the number of digital outputs produced by divider 111 can be any value greater than one, but as a practical upper limit there doesn't appear to be any advantage to have the value of N exceed the value of M. The values of P and Q are both dependent upon N and the particular framing format used in the digital input to FIG. 1. It should be noted that framing detector 115 is connected to detect the framing pattern exclusively among the N lines applied to the channel separator and recombiner 113. In this situation, the nature of the occurrence of the framing pattern is dependent upon the operating mode of divider 111. Framing detector 115, therefore, must simultaneously look for all the possibilities of the occurrence of a framing pattern to ascertain which one actually does occur. Hence, Q parallel lines are required to cover all these possibilities.

The specific operation of the circuitry in FIG. 1 will be dependent upon the framing format. For example, for a frame comprising two low-speed bitstreams with a single framing bit every A (where A is even) information bits, the framing pattern can be expressed as:

$$. . . //AInfo/F_i/AInfo/F_i/AInfo/F_i// . . .$$

at R bits per second, and where the A information bits follow the pattern:

$$/1\ 2\ 3\ 4 . . . (A-1)\ A/$$

where the numbers represent the successive information bits in corresponding time slots and Channel 1 bits are 1, 3 . . . (A−1)

Channel 2 bits are 2, 4 . . . A

The $F_i$ framing bits, in this instance, form a predetermined pattern that is identified by the circuitry of FIG. 1. The pattern of the framing bits, for example, can be all 1's, all 0's, alternate 1's and 0's, or any other known pattern. If N is selected to be equal to M which is two, divider 114 divides the output of clock 112 by N/2 + 1 to produce $\phi_1$ and $\phi_2$ phases. The values of P and Q according to this format are both two. Divider 114 produces pulses in the $\phi_1$ phase for every output pulse of clock 112 except for every A/2 pulse. At these times, divider 114 instead produces a pulse in the $\phi_2$ phase. Divider 114 and framing detector 115 operate in the previously described manner to locate the framing pattern to obtain synchronization. If divider 111 is in mode 1, then the output is as follows:

First digital line 1 3 5 . . . (A−1) $F_i$ 2 . . . (A−2) A1
Second digital line 2 4 6 . . . A 1 3 . . . (A−1) $F_i$ 2

If divider 111 is in mode 2, then the outputs are now:

First digital line 2 4 6 . . . A 1 3 . . . (A−1) $F_i$ 2
Second digital line 1 3 5 . . . (A−1) $F_i$ 2 . . . A 1 3

In this case, Q lines are connected to framing detector 115 so that either of the two framing patterns will be detected and the appropriate mode signal sent to the channel separator and recombiner 113. It will be understood that framing detector 115 contains counting circuitry which operates in a well-known manner to ascertain a synchronous framing condition after a predetermined number of framing patterns have elapsed. Conversely, detector 115, in a similar fashion, will detect a loss of synchronous framing after an occurrence of a specified number of mistakes are received in the framing pattern. Since a framing pattern will occur in either of two possible forms, detector 115 contains counting circuitry that works independently for each of the possible forms. This operation of detector 115 can be characterized as being statistical in nature. It should also be noted that because of the relationship between the framing format and the dividing mode of divider 111, a symmetrical pattern is produced in the output thereof. Due to this symmetry a mode signal will not be required if an increase in the time required to achieve framing synchronization is tolerated. The described framing detector operation is considered conventional and any one of a number of known framing algorithms can be adopted and advantageously utilized herein.

If another format is used as a digital input to FIG. 1 which comprises B (where B is even) information bits per frame followed by two framing bits, i.e., $F_1$ and $F_2$, this format can be represented as:

$$\ldots //BInfo/F_1F_2/BInfo/F_1F_2// \ldots$$

at R bits per second, and where the B information bits follow the pattern:

$$/1\ 2\ 3\ 4 \ldots (B-1)\ B/$$

where the numbers represent the successive information bits in the corresponding time slots and Channel 1 bits are 1, 3 . . . (B−1)

Channel 2 bits are 2, 4 . . . B

Again, M is equal to N, which has a value of two. For this new format, the principal change in the circuitry of FIG. 1 will occur inside the channel separator and recombiner 113. In mode 1, the output of divider 111 is First digital line $F_1$1 3 . . . (B−1) $F_1$ 1 3 . . . (B−1) $F_1$ Second digital line $F_2$ 2 4 . . . B $F_2$ 2 4 . . . B $F_2$ In this mode, the information bits of the two digital lines are fed straight through the channel separator and recombiner 113 to the two outputs. In mode 2, the output of divider 111 is First digital line B $F_2$ 2 4 6 . . . (B−2) B $F_2$ 2 4

Second digital line $F_1$ 1 3 5 7 . . . (B−1) $F_1$ 1 3 5

The two outputs of the channel separator and recombiner 113 are now reversed for the second mode with respect to the two digital input lines. In this example and the preceding one, it should be understood that appropriate logic circuitry is included in the channel separator and recombiner 113 to inhibit the framing bits from appearing at the channel outputs.

Figure 2:
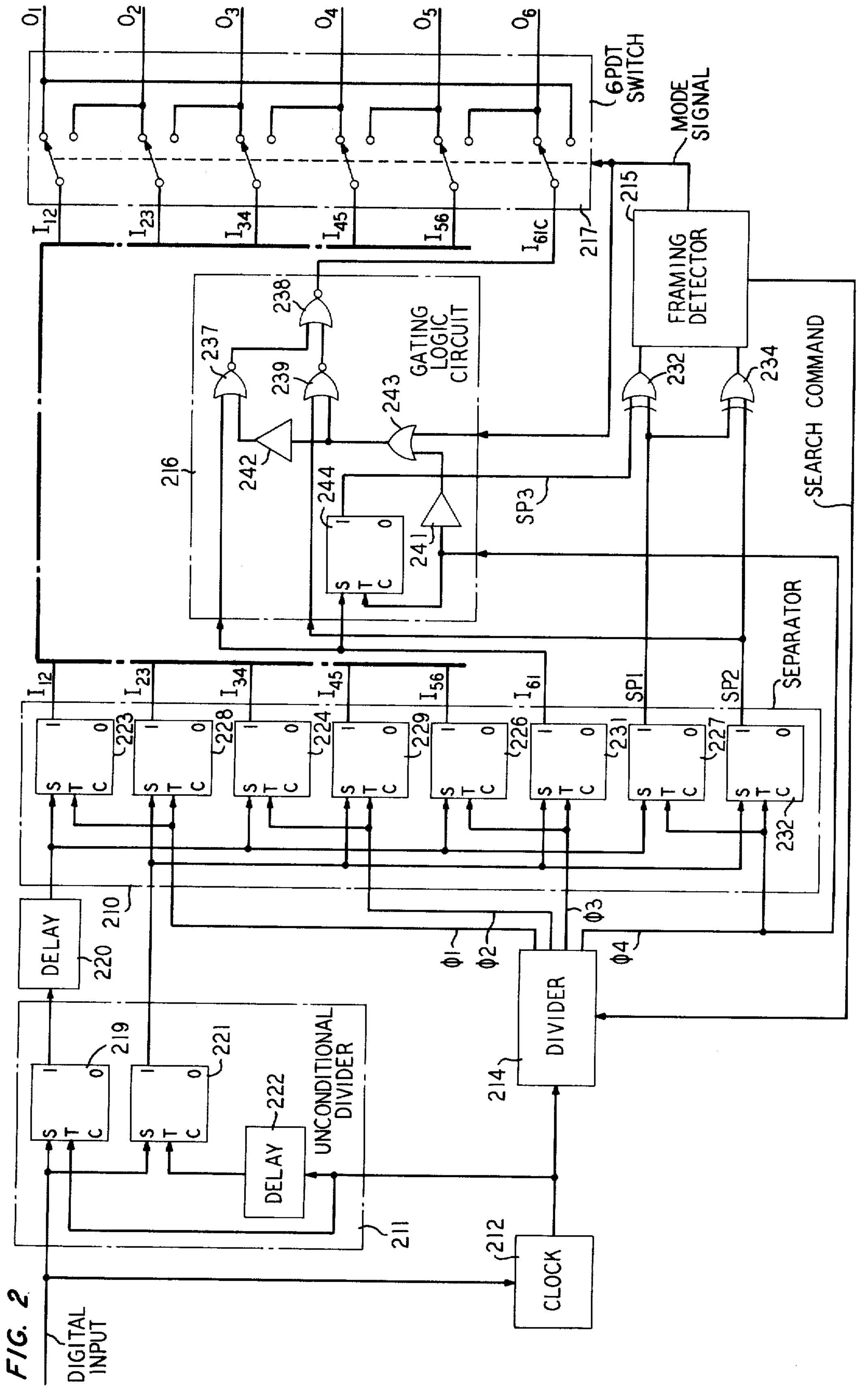
FIG. 2 is a more detailed schematic block diagram of specific demultiplexing apparatus according to the invention.

FIG. 2 depicts the specific illustrative embodiment in accordance with the invention wherein the values of the division factor, N, is two and the number of multiplexed channels, M, is six. It can be readily seen that the diagram of FIG. 2 generally corresponds to FIG. 1. Similar components of FIGS. 1 and 2 which perform the same or an analogous function are designated with reference numerals ending in the same last two digits. Specifically, these components of FIG. 2 are divider 211, clock 212, divider 214 and framing detector 215. It should also be noted that separator 210, gating logic 216 and switch 217 cooperate with each other to perform the same function as the channel separator and recombiner 113 in FIG. 1.

Divider 211 divides the incoming digital bitstream into two bitstreams which are respectively produced at the outputs of flip-flops 219 and 221. These flip-flops are toggled by the output of clock 212 to perform a sample and hold function. The insertion of delay 222 between the toggle input of flip-flop 221 and the output of clock 212 enables each pulse supplied by the clock to toggle flip-flops 219 and 221 at different times. Specifically, the delaying interval introduced by delay 212 corresponds to a time slot in the digital input bitstream. Therefore, as flip-flop 219 samples one bit in the incoming bitstream, flip-flop 221 samples the next successive bit. Clock 212 thus is only required to run at half the bit rate of the input bitstream to sample each bit therein. Since flip-flops 219 and 221 also perform a holding function, the time slot common to each of their outputs has a duration which is double that of a time slot in the digital input. The presence of delay 220, which has the same characteristic as delay 222, insures that the outputs of flip-flops 219 and 221 are aligned chronologically.

Separator 210 receives the two outputs of divider 211. Separator 210 is internally connected such that the output of flip-flop 219 is applied to flip-flops 223, 224, 226 and 227 while the output of flip-flop 221 is applied to flip-flops 228, 229, 231 and 232. Separator 210 also receives the multiphased output labeled $\phi_1$ through $\phi_4$ from divider 214. The multiphased output of divider 214 is derived from clock 212 and toggles the respective flip-flops located in separator 210. Separator 210 in accordance with these multiphased signals divides the two incoming bitstreams from divider 211 into eight bitstreams. Initially, divider 214 proceeds to supply its multiphased output to the respective flip-flops of separator 210, such that the two incoming bitstreams applied thereto are successively distributed in a nonsynchronous manner among its eight outputs connected to conductors labeled $$I_{12}\ I_{23}\ I_{34}\ I_{45}\ I_{56}\ I_{61}\ SP_1 \text{ and } SP_2$$

The first five outputs are connected directly to switch 217 while $I_{61}$ is connected to the switch through gating logic circuit 216. The internal circuitry of gating logic circuit 216 will be described hereinafter. Outputs $SP_1$ and $SP_2$ are applied to exclusive-OR gates 232 and 234 which are connected to the inputs of framing detector 215. Framing detector 215 serves to identify the occurrence of a predetermined framing pattern at its two inputs. If neither one of its two inputs produces the predetermined framing pattern, framing detector 215 issues a search signal which is applied to divider 214. Divider 214, in response thereto, shifts its multiphased output in unison. This process is continuously repeated until the occurrence of a framing pattern at one of the two inputs to framing detector 215. Once the framing pattern is detected, the respective flip-flops in separator 210 begin to synchronously distribute the incoming bits among its eight output lines. Concurrently, framing detector 215 also issues a mode signal to gating logic circuit 216 and switch 217, which comprises a six pole, double throw switch arrangement. In response to the mode signal, switch 217 simultaneously places all the switches contained therein in a common position that establishes the appropriate interconnection between the six inputs and six outputs of the switch. The circuitry of FIG. 2 now operates to synchronously demultiplex the transmitted bitstream.

Gating logic circuit 216 is connected to the outputs of flip-flops 231 and 232 and supplies two outputs: one to conductor $I_{61C}$ of switch 217 and the other to exclusive-OR gate 232 via the conductor labeled $SP_3$. The signal on the $I_{61C}$ output conductor of circuit 216 is obtained from either of the two aforementioned inputs thereto. The output of flip-flop 231 from conductor $I_{61}$ to switch 217 is supplied by the signal path comprising NOR gates 237 and 238. Output signals for application to switch 217 may also originate from flip-flop 232 via NOR gates 239 and 238. The mode signal from framing detector 215 and the $100_4$ pulses from divider 214 applied through the arrangement of inverters 241 and 242 and OR gate 243 serve to enable or inhibit either gates 237 or 239. These gates accordingly provide the through signal path in circuit 216 to conductor $I_{61C}$. The $SP_3$ output of circuit 216 is provided by toggling flip-flop 244 by the occurrence of the $\phi_4$ pulse from divider 214. At these times, the signal on conductor $I_{61}$ from flip-flop 231 is applied to gate 232. The function of gating logic circuit 216 will be discussed more fully in the explanation of the operation of the circuitry of FIG. 2.

The format of the high-speed bitstream will be discussed first since it will greatly facilitate an understanding of the circuit operation. The format of the high-speed bitstream is:

. . . //96Info/S$\bar{S}$/96Info/PP// . . .

(Frame Length - 196 bits) where:
P depicts a parity bit which permits monitoring of line performance.
S indicates a synchronization bit which signals the locations of stuffed time slots.
96 Info represents the total of 16 information bits from six different channels which are grouped in the order of ascending channels. The 96 information bits in the format follow the pattern:

/1 2 3 4 5 6 7 . . . 89 90 91 92 93 94 95 96/ where the numbers represent the successive information bits in corresponding time slots and
Channel 1 bits are 1, 7, 13 . . . 91
Channel 2 bits are 2, 8, 14 . . . 92
Channel 3 bits are 3, 9, 15 . . . 93
Channel 4 bits are 4, 10, 16 . . . 94
Channel 5 bits are 5, 11, 17 . . . 95
Channel 6 bits are 6, 12, 18 . . . 96

Framing synchronization within this format is accomplished by use of the even-odd alteration (i.e., alternate 0's and 1's) produced by an exclusive-OR operation performed on two P bits, two S bits, two P bits, and so on, with a period of 196 bits. The present invention utilizes the parity characteristic of this format, but only after the high-speed bitstream is unconditionally divided into a number of lower speed bitstreams. It should also be understood that the application of the present invention is not limited to this particular format and, furthermore, the great flexibility afforded in the design and operation of the invention makes same readily adaptable to any one of a substantial variety of formats.

Figure 3:
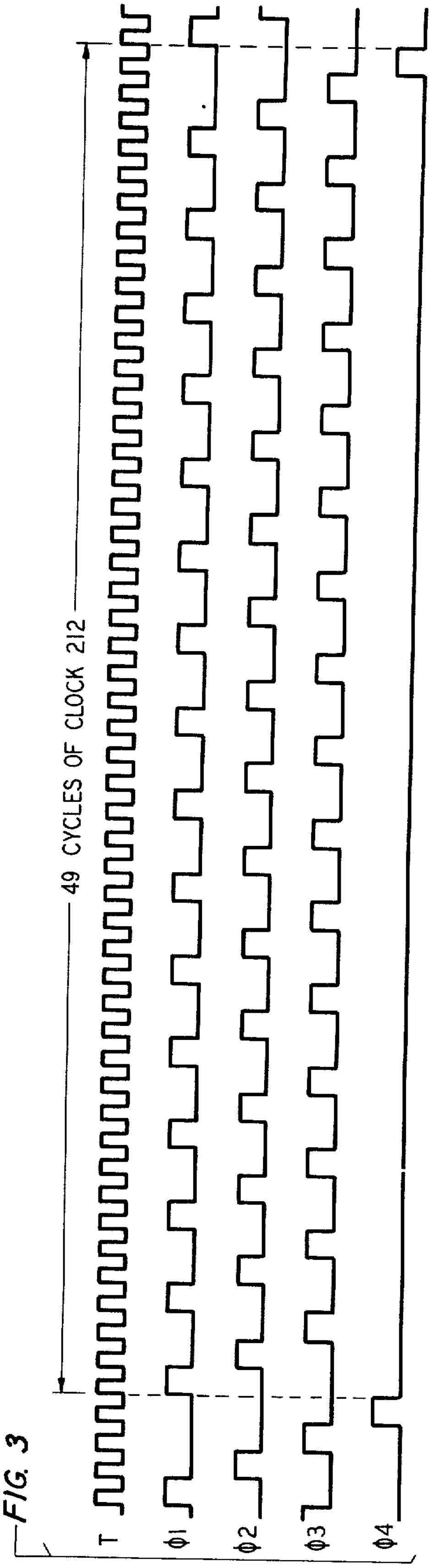
FIG. 3 depicts waveforms useful in explaining the operation of the embodiment of FIG. 2.

In operation, the digital signal in the foregoing format is applied to divider 211. Clock 212 derives a clock signal from the digital input that has a frequency of half the bit rate of the digital input. In FIG. 3, waveform T depicts the output of clock 212. It should be noted that since clock 212 runs at half the rate of the digital input, an interval of 49 cycles of the output from the clock corresponds to the occurrence of 96 information bits and two control bits (i.e., stuffing bits or parity bits) in the high-speed digital input of FIG. 2. Since divider 211 successively distributes the bits in the digital input applied thereto nonsynchronously among two outputs, there are only two modes of operation for divider 211. Divider 211, in the first mode, will produce the first bit of each frame at the output of flip-flop 219. The next successive bit or the second bit will therefore be produced at the output of flip-flop 221. As this operation continues throughout each frame, all the odd-numbered bits will be produced by the output of flip-flop 219, while all the even-numbered bits are produced by the output of flip-flop 221. At the same time the output of clock 212 toggles flip-flops 219 and 221, it also serves as a reference signal for divider 214. Waveforms $\phi_1$ through $\phi_4$ shown in FIG. 3 are produced by the output of divider 214. Although the timing relationship among waveforms $\phi_1$ through $\phi_4$ is fixed as illustrated in FIG. 3, the search command output of framing detector 215 applied to divider 214 serves to produce an extra pulse in the $\phi_4$ waveform which shifts waveforms $\phi_1$ through $\phi_4$ in unison one time slot with reference to waveform T in FIG. 3. This operation is repeated continuously until a framing pattern appears at either one of the two inputs to framing detector 215. The multiphased outputs of divider 214 are applied to the toggling inputs of the respective flip-flops shown in separator 210. Upon the occurrence of a $\phi_1$ pulse, flip-flops 223 and 228 are toggled to provide output signals indicative of their respective input signals. The subsequent occurrences of pulses $\phi_2$ through $\phi_4$ also provide, as supplied by divider 211, corresponding outputs from the other flip-flops located in separator 210. When divider 211 is in the first mode of operation, the even-odd alternation produced by the parity and stuffing bits is applied to framing detector 215 via exclusive-OR gate 234. At this time separator 210 begins to synchronously distribute the two bitstreams applied thereto among the eight outputs shown in the drawing. In the first mode, the following table represents the fixed pattern produced by the synchronous distribution of the bits in the bitstream applied to divider 211.

| MODE I | | INFORMATION AND CONTROL BITS | | | SOURCE |
|---|---|---|---|---|---|
| $\phi_1$ | I12: | 1, 7...91, | 1, 7...91, | 1, 7...91 | ← All Ch1 |
| | I23: | 2, 8...92, | 2, 8...92, | 2, 8...92 | ← All Ch2 |
| $\phi_2$ | I34: | 3, 9...93, | 3, 9...93, | 3, 9...93 | All Ch3 |
| | I45: | 4,10...94, | 4,10...94, | 4,10...94 | ← All Ch4 |
| $\phi_3$ | I56: | 5,11...95, | 5,11...95, | 5,11...95 | ← All Ch5 |
| | I61: | 6,12...96, | 6,12...96, | 6,12...96 | ← All Ch6 |
| $\phi_1$ | SP1: | P, | S, | P | ← All framing bits |
| | SP2: | P, | $\bar{S}$, | P | ← All framing bits |
| | SP3: | 96, | 96, | 96 | ← Some Ch6 bits |
| Output of exclusive OR gate 234 | | 0, | 1, | 0 | |

It should be noted that exclusive-OR gate 234 provides the alternating pattern of 0's and 1's to framing detector 215. The $\phi_4$ pulses of divider 214 toggle flip-flop 244 which supplies the 96th information bit from channel 6 to exclusive-OR gate 232, but this will be disregarded by the framing detector 215 due to the statistical procedure used therein to identify the framing pattern. Framing detector 215 provides a logical 1 level for the mode signal which is applied to switch 217 and gating logic circuit 216. In response, switch 217 assumes the position shown in FIG. 2 to provide channel outputs $O_1$ through $O_6$. OR gate 243 in gating logic circuit 216 produces 1 output. This signal forces the output NOR gate 239 to a 0 state so it has no effect upon NOR gate 238. The presence of inverter 242, on the other hand, changes the 1 output of gate 243 to a 0 so it has no effect upon NOR gate 237. The overall effect is that NOR gates 237 and 238 provide the through signal path which connects conductor $I_{61}$ to conductor $I_{61C}$.

In the second mode of operation of divider 211 the output of flip-flop 219 corresponds to all of the even bits in the digital input, while the output of flip-flop 221 corresponds to the odd bits in the digital input. Divider 214 and framing detector 215 again search for the even-odd framing pattern. At this time, exclusive-OR gate 232 provides the framing pattern input to framing detector 215. In the second mode the operation of separator 210 can be characterized as:

| MODE 2 | | INFORMATION AND CONTROL BITS | | | SOURCE |
|---|---|---|---|---|---|
| $\phi_1$ | $I_{12}$: | 2, 8...92, | 2, 8...92, | 2, 8...92 | ← All Ch2 bits |
| | $I_{23}$: | 3, 9...93, | 3, 9...93, | 3, 9...93 | ← All Ch3 bits |
| $\phi_2$ | $I_{34}$: | 4, 10...94, | 4, 10...94, | 4, 10...94 | ← All Ch4 bits |
| | $I_{45}$: | 5, 11...95, | 5, 11...95, | 5, 11...95 | ← All Ch5 bits |
| $\phi_3$ | $I_{56}$: | 6, 12...96, | 6, 12...96, | 6, 12...96 | ← All Ch6 bits |
| | $I_{61}$: | 7, 13... P, | 7, 13... S, | 7, 13... P | ← Some Ch1 and some framing bits |
| $\phi_4$ | $SP_1$: | P | $\bar{S}$ | P | ← All framing bits |
| | $SP_2$: | 1 | 1 | 1 | ← Some Ch1 bits |
| | $SP_3$: | P | S | P | ← All framing bits |
| Output of exclusive OR gate 232 | | 0 | 1 | 0 | |

reference to the table for mode 2, it can be seen that most of the channel 1 information bits appear on conductor $I_{61}$. Furthermore, the missing channel 1 bits appear on conductor $SP_2$ and framing bits instead appear in their time slots on conductor $I_{61}$. It therefore is necessary for gating logic circuit 216 to correct the bitstream on conductor $I_{61}$ before application to switch 217. As previously stated, framing detector 215 produces a logical 0 output in mode 2. Since this signal level has no effect upon OR gate 243, the other input signal, $\phi_4$, applied to gate 243 now controls the output of the gate. In the absence of a $\phi_4$ pulse, inverter 241 supplies a logical 1 level output. With this signal level, the through signal path remains the same as before, i.e., through NOR gates 237 and 238. Upon the occurrence of a $\phi_4$ pulse, the output of inverter 241 changes to a 0 level. The output signal of OR gate 243 also changes to a 0 level. This latter change shifts the output of inverter 242 to a 1 level which forces the output of NOR gate 237 to a 0 level. This 0 level has no effect upon NOR gate 238 so that the other input signal to NOR gate 237 is inhibited. Since one input of NOR gate 239 is connected to the output of OR gate 243, the logical 0 level present allows the other input signal to NOR gate 239 to determine the output of NOR gate 238. This new through signal path therefore connects conductors $SP_2$ to $I_{61C}$ for the duration of pulse $\phi_4$. Since this coincides with the occurrence of the first channel 1 information bit, all the information on conductor $I_{61C}$ corresponds to channel 1 bits and the signal shift at the output of separator 210 produced by the second operating mode of divider 211 is thereby fully compensated.

As can be seen from the foregoing table, the distribution of the information bits and the framing bits by separator 210 is shifted significantly in mode two. In this mode, the $\phi_4$ pulses from divider 214 toggle flip-flop 244 when the framing bits are present on conductor $I_{61}$. The output of flip-flop 244 changes state to reproduce these framing bits on conductor $SP_3$ which is connected to exclusive-OR gate 232. The other input to gate 232 is connected to conductor $SP_1$ to accept the other framing bits from the output of flip-flop 227. These two inputs when compared by exclusive-OR gate 232 produce the alternate 1 and 0 framing pattern. Framing detector 215, in response, produces a logical 0 level in the mode signal. Switch 217 responds to the new mode signal by assuming a position other than the one in FIG. 2. In this new position, the channel outputs $O_1$ through $O_6$ are connected to different inputs of switch 217 thereby substantially compensating for the shift produced by the second operating mode of divider 211. By It is emphasized that although specific values were selected for N and M for the purposes of illustrating the various applications of the present invention, other values may be used by those skilled in the art. For instance, when the value of N is increased the speed requirement of the logic circuit is reduced at the cost of an increase in circuit complexity. Such a trade-off, however, may be desirable since low-speed logic components cost less and consume less power than high-speed components. The value of M selected for each application of the invention is a function of the relationship between the capacity of the high-speed digital transmission system and the amount of information produced by the channels to be multiplexed. Furthermore, although the application of the invention has been discussed with regard to demultiplexing apparatus, the framing synchronization arrangement disclosed herein can be utilized in other types of apparatus.

Accordingly, it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. In a time division multiplexed digital transmission system wherein the transmitted bitstream comprises a plurality of channels in a framed format, receiving apparatus for demultiplexing the bitstream comprising:
  - means for nonsynchronously distributing the bits of the received bitstream successively to form N low-speed digital bitstreams, each of the N digital bitstreams comprising bits corresponding to invariable positions in the received bitstream;
  - dividing means responsive to the received bitstream for producing P phased output signals;
  - switching means connected to receive the P phased output signals and the N low-speed bitstreams serving to redistribute the bits of the N bitstreams to supply a digital signal to each of M outputs; and
  - detecting means for identifying any one of N possible framing patterns among the N low-speed bitstreams, said detecting means supplying a signal to said dividing means to shift the P phased outputs thereof in relation to the bits of said N digital bitstreams until the occurrence of one of N framing patterns, said detecting means identifying the framing pattern that does occur which indicates the operating mode of said means for nonsynchronously distributing and in response serving to signal the same to said switching means which in accordance with the operating mode redistributes the bits of the N digital bitstreams to provide a digital signal for each of said M outputs corresponding to one of said plurality of channels wherein N, P and M are integers greater than one.

2. The demultiplexing apparatus as defined in claim 1 wherein the number of N digital bitstreams is 2 and the number of M outputs is 2.

3. The demultiplexing apparatus as defined in claim 2 wherein said dividing means produces two coexisting output signals displaced in phase from each other and said detecting means is capable of identifying either of two possible framing patterns.

4. Demultiplexing apparatus for demultiplexing a time division multiplexed high-speed bitstream comprising successive frames separated by stuffing and parity bits that convey framing information and wherein each frame corresponds to a plurality of multiplexed low-speed bitstreams, said demultiplexing apparatus comprising:
  - sampling means for unconditionally dividing the high-speed bitstream into a plurality of medium-speed bitstreams wherein the duration of each time slot in the medium-speed bitstreams is equal to the factor of the division times the duration of a time slot in the high-speed bitstream;
  - dividing means for separating each of said medium-speed bitstreams into a plurality of low-speed bitstreams;
  - detecting means for monitoring selected low-speed bitstreams, said detecting means supplying a feedback signal to said dividing means to alter the output of the same until said detecting means identifies the occurrence of a framing pattern produced by the stuffing and parity bits, the nature of the occurrence of said pattern also serving to indicate the operating mode of said sampling means; and
  - switching means connected to receive said low-speed bitstreams and having a plurality of outputs, said switching means being operative in response to a mode signal from said detecting means to selectively couple said low-speed bitstreams to said plurality of outputs.

5. The demultiplexing apparatus according to claim 4 wherein said sampling means comprises first and second bistable means, clocking means and delaying means, said first and second bistable means each having one input connected to receive the high-speed bitstream and a toggle unit, said clocking means in circuit relationship with the high-speed bitstream and providing an output signal having a frequency corresponding to half the bit rate of the high-speed bitstream, and the output of said clocking means being directly applied to the toggle input of said first bistable means and applied to the toggle input of said second bistable means through said delaying means such that when the output signal of said clocking means toggles said first bistable means to sample a bit of the high-speed bitstream to produce an output for a first medium-speed bitstream said second bistable means is subsequently toggled by the same output signal of said clocking means to sample the next successive bit of the high-speed bitstream to provide an output for a second medium-speed bitstream.

6. The demultiplexing apparatus according to claim 5 wherein said dividing means comprises a plurality of bistable means each having a toggle input and half of which have an input connected to receive the first medium-speed bitstream and the other half of which have an input connected to receive the second medium-speed bitstream, and multiphasing means connected to receive the output of said clocking means for producing a plurality of output signals staggered in phase, each output signal of said multiphasing means being applied to the toggle inputs of a pair of bistable means, the first of said pair connected to receive the first medium-speed bitstream and the second of said pair connected to receive the second medium-speed bitstream, and said plurality of bistable means sampling the medium-speed bitstreams in response to the output of said multiphasing means to provide the plurality of low-speed bitstreams.

7. The demultiplexing apparatus according to claim 6 wherein said detecting means comprises first and second gating means each connected to receive a pair of low-speed bitstreams from said dividing means such that said first gating means produces an output signal indicative of framing synchronization when said sampling means is operating in a first mode while said second gating means produces an output signal indicative of framing synchronization when said sampling means is operating in a second mode.

8. The demultiplexing apparatus according to claim 6 further comprising logical means connected to receive one of the low-speed bitstreams applied to said first gating means and a low-speed bitstream from said dividing means, said logical means acting in response to one of the output signals from said multiphasing means and the mode indication from said detecting means to provide a first output signal to said switching means indicative of information bits and another output signal to said second gating means for producing an output signal indicative of framing synchronization when said first sampling means is operating in the second mode.

9. The demultiplexing apparatus according to claim 8 wherein said switching means has a configuration corresponding to a six pole, double throw switch.

* * * * *

UNITED STATES PATENT OFFICE

CERTIFICATE OF CORRECTION

PATENT NO. : 3,909,541

DATED : September 30, 1975

INVENTOR(S) : Richard T. Bobilin

It is certified that error appears in the above-identified patent and that said Letters Patent are hereby corrected as shown below:

Column 3, line 31, "of" should read --by--.
Column 6, line 58, "$100_4$" should read --$\phi_4$--.
Column 12, line 17, "unit" should read --input--.

Signed and Sealed this

*sixth* Day of *January 1976*

[SEAL]

*Attest:*

RUTH C. MASON
*Attesting Officer*

C. MARSHALL DANN
*Commissioner of Patents and Trademarks*